(12) United States Patent
Kong et al.

(10) Patent No.: US 9,106,274 B2
(45) Date of Patent: *Aug. 11, 2015

(54) DUAL CARRIER SEPARATION

(71) Applicant: Broadcom Corporation, Irvine, CA (US)

(72) Inventors: Hongwei Kong, Denville, NJ (US); Radhakrishnan Kuzhipatt, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/268,996

(22) Filed: May 2, 2014

(65) Prior Publication Data

US 2014/0241336 A1    Aug. 28, 2014

Related U.S. Application Data

(63) Continuation of application No. 13/541,153, filed on Jul. 3, 2012, now Pat. No. 8,750,174.

(60) Provisional application No. 61/618,049, filed on Mar. 30, 2012.

(51) Int. Cl.
*H04B 1/00* (2006.01)
*H04J 1/00* (2006.01)

(52) U.S. Cl.
CPC .............. *H04B 1/0057* (2013.01); *H04J 1/00* (2013.01)

(58) Field of Classification Search
None
See application file for complete search history.

(56) References Cited

U.S. PATENT DOCUMENTS

| 6,310,863 | B1 * | 10/2001 | Yamamoto | 370/281 |
| 2005/0163038 | A1 * | 7/2005 | Anvari | 370/203 |
| 2008/0112519 | A1 * | 5/2008 | Jung et al. | 375/350 |
| 2011/0222411 | A1 * | 9/2011 | Koskinen et al. | 370/241 |
| 2013/0028178 | A1 * | 1/2013 | Comeau | 370/328 |
| 2013/0163512 | A1 * | 6/2013 | Rexberg et al. | 370/328 |

\* cited by examiner

*Primary Examiner* — Hong Cho
(74) *Attorney, Agent, or Firm* — McDermott Will & Emery LLP

(57) ABSTRACT

Disclosed are various embodiments providing carrier separation to effectuate a dual carrier operation of a wireless communication device. Processing circuitry may acquire a single carrier signal based on a determined time slot boundary, the single carrier signal comprising primary carrier data. The processing circuitry may receive a dual carrier radio frequency signal based on the determined time slot boundary, the dual carrier radio frequency signal comprising the primary carrier data and secondary carrier data. The processing circuitry may then generate a baseband dual carrier signal by demodulating the dual carrier radio frequency signal. The processing circuitry may separate the primary carrier data from the baseband dual carrier signal by filtering the baseband dual carrier signal. The processing circuitry may also separate the secondary carrier data from the baseband dual carrier signal by filtering the baseband dual carrier signal.

20 Claims, 5 Drawing Sheets

DUAL CARRIER SEPARATION

CROSS-REFERENCE TO RELATED APPLICATIONS

This application is a continuation of U.S. patent application Ser. No. 13/541,153, filed Jul. 3, 2012, now U.S. Pat. No. 8,750,174, entitled "DUAL CARRIER SEPARATION," which claims the benefit of U.S. Provisional Patent Application entitled, "Cellular Baseband Processing", having Ser. No. 61/618,049, filed Mar. 30, 2012, both of which are entirely incorporated herein by reference.

BACKGROUND

Cellular network providers purchase rights to portions of a frequency spectrum to provide data communication services to end users. For example, a network provider may be allocated a block of 10 MHz for transmitting data to the end user. However, under some data communication protocols, such as High-Speed Downlink Packet Access (HSDPA), for example, a wireless communication device utilizes a bandwidth that is substantially less than the bandwidth allocated to the network provider. In HSDPA, for example, a single carrier is 5 MHz. Thus, under the HSDPA protocol, a wireless communication device is utilizing only a 5 MHz carrier in spite of having 10 MHZ of available bandwidth for the network provider.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to wireless communication devices configured to operate in a dual carrier wireless communication system. In a dual carrier wireless communication system, one or more network providers may transmit data to a single wireless communication device by using at least two carriers. The wireless communication device employs carrier separation to separate the received carriers and processes the data encoded in each carrier, accordingly. Moreover, various embodiments of the present disclosure provide a carrier separation operation without requiring the wireless communication device to perform a reacquisition of the dual carrier network. To this end, a wireless communication device may transition from a single carrier network to a dual carrier network without performing a new cell search operation to facilitate attachment to the network. The various embodiments of the present disclosure may be applied to any radio frequency application such as, for example, WiFi, WiMax, LTE, or any other broadband or cellular communication standards.

Furthermore, various embodiments of the present disclosure address implementing predetermined delays depending on whether a wireless communication device is configured for single carrier or dual carrier operation. When a wireless communication device transitions from a single carrier mode to a dual carrier mode, synchronization to a synchronized data frame transmission structure may be maintained by implementing predetermined delays in a signal path.

While a wireless communication device is initially configured to operate in a single carrier mode, the wireless communication device may send a request to the cellular network to operate in a dual carrier mode. This request may be made when a wireless communication device desired more bandwidth.

Figure 1:
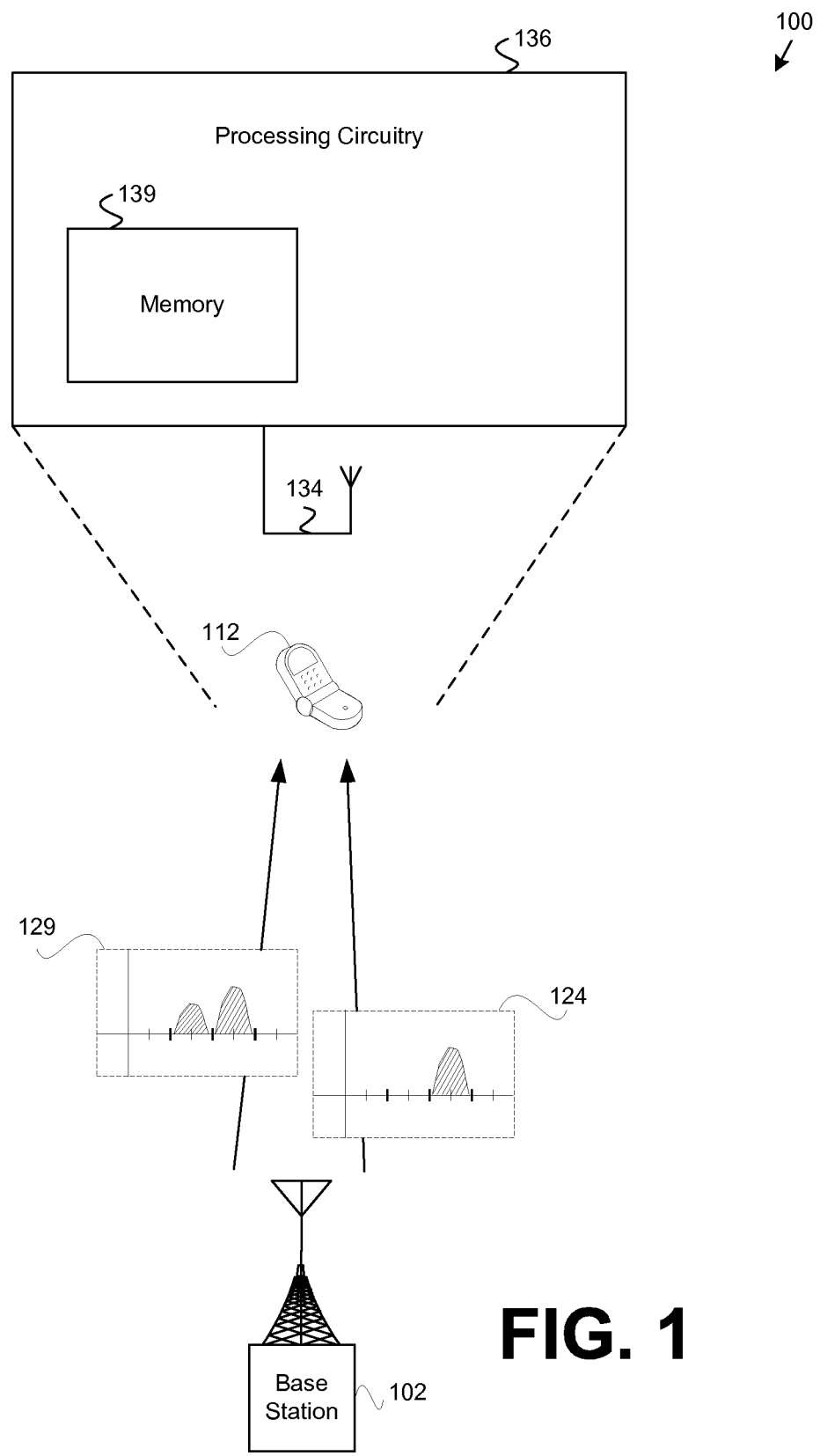
FIG. 1 is a drawing of an example of a wireless communication system, in accordance with an embodiment of the present disclosure.

Moving onto FIG. 1, shown is a drawing of an example of a wireless communication system, in accordance with an embodiment of the present disclosure. Specifically, there is shown an example of a wireless communication system 100 including a base station 102 and wireless communication device 112. The wireless communication device 112 includes processing circuitry 136 for facilitating data communication operations of the wireless communication device 112.

In various embodiments, the processing circuitry 136 is implemented as at least a portion of a microprocessor. The processing circuitry 136 may include one or more circuits, one or more microprocessors, application specific integrated circuits, dedicated hardware, or any combination thereof. In yet other embodiments, processing circuitry 136 may include one or more software modules executable within one or more processing circuits. The processing circuitry 136 may further include memory 139. The memory 139 may store instructions and/or code to cause the processing circuitry to execute data communication functions.

Communicatively coupled to the processing circuitry 136 are one or more antennas 134. In various embodiments, the antenna 134 is a single antenna configured to receive radio frequency (RF) electromagnetic signals. In other embodiments, the antenna 134 comprises two or more antennas for receiving RF signals. Accordingly, the two or more antennas may be configured for diversity combination for processing received RF signals.

The base station 102 within the wireless communication system 100 may transmit data to a wireless mobile device 112. The base station 102 may send downlink data to the wireless communication device 112, where the data is encoded in a single carrier signal 124. The single carrier signal 124, comprises a predefined bandwidth set forth by a wireless data communication protocol, for example, but not limited to, HSDPA.

In other embodiments, a base station 102 may transmit a dual carrier signal 129. In this respect, a dual carrier mode is effectuated by the base station 102. The antenna 134 of the wireless communication device 112 may receive a dual carrier RF signal 129. The dual carrier RF129 signal received at the antenna 134 is an aggregation of the various carrier signals transmitted by a base station 102. The dual carrier signal may comprise primary carrier data encoded in a primary carrier signal and secondary carrier data encoded in a secondary carrier signal. Furthermore, the primary carrier signal and the secondary carrier signal may occupy respective, non-overlapping bandwidths. To this end, the dual carrier signal 129 is effectively an aggregation of multiple carrier signals.

In various embodiments, the wireless communication device 112 is configured for data communication in a single carrier mode. In this case, the wireless communication device 112 receives data from a base station 102 using a single carrier. In the example of FIG. 1, the wireless communication device 112 receives a single carrier signal 124 from a base station 102. Accordingly the processing circuitry 136 of the wireless communication device 112 decodes the single carrier signal 124 to extract downlink data.

In various embodiments, the wireless communication device 112 is configured for data communication in a dual carrier mode. In this case, the wireless communication device 112 receives data from a base station 102. In the example of FIG. 1, the wireless communication device 112 receives a dual carrier signal 129. The dual carrier signal 129 is made up of primary carrier data transmitted from a base station 102 and the second carrier data transmitted from the base station 102. The processing circuitry 136 of the wireless communication device 112 performs a carrier separation operation to separate the primary carrier data and the secondary carrier data.

Furthermore, in dual carrier mode, two carriers are received by the wireless communication device 112 such that each carrier correlates to non-overlapping, adjacent bandwidths. For example, if a network provider has 10 MHz of bandwidth resources to transmit downlink data to a wireless communication device 112, then first carrier data may be encoded to have a bandwidth of 5 MHz occupying the upper half of the available 10 MHz and the second carrier data may also be encoded to have a bandwidth of 5 MHz occupying the lower half of the available 10 Mhz. To this end, the entire 10 MHz of available bandwidth may be utilized by transmitting downlink data over multiple carriers.

To initiate operation in a single carrier mode, the wireless communication device 112 must first perform acquisition of the network. Non-limiting examples of acquisition are performing a cell search, synchronizing to the network, identifying a scrambling code for a base station 102.

In various embodiments, to perform synchronization, a base station 102 transmits a primary synchronization signal (psync) and a secondary synchronization signal (ssync) to facilitate a cell search by a wireless communication device 112. The psync and ssync are received by one or more antennas 134 of the wireless communication device 112. The psync allows the wireless communication device 112 to ascertain a time slot boundary. In this respect, data communication is performed according to transmitting and receiving with respect to predetermined time slots. Thus, a wireless communication device 112 that wishes to communicate over a cellular network must ascertain the boundaries of a time slot. Furthermore, a plurality of time slots may make up a frame. An ssync may be used by the wireless communication device 112 to ascertain frame boundaries, as frame boundaries are made up of systematically repeating time slots. Thus, by receiving synchronization signals from a base station 102 the wireless communication device can effectuate acquisition and begin receiving downlink data encoded in a single carrier signal 124.

In various embodiments of the present disclosure, the wireless communication device 112 may transition from a single carrier mode to a dual carrier mode without performing reacquisition. That is to say, the wireless communication device 112 may first receive a single carrier signal 124 transmitted from a base station 102 such that the single carrier signal 124 contains encoded primary carrier data. The wireless communication device 112 may then transition to a dual carrier mode to receive a dual carrier signal 129. The dual carrier signal 129 is transmitted by a base station 102 such that the dual carrier signal 129 contains the primary carrier data encoded in one carrier signal and also contains secondary carrier data encoded in the another carrier signal. In various embodiments, transitioning from a single carrier mode to a dual carrier mode does not require the wireless communication device 112 to perform reacquisition to attach to the dual carrier network. Although a delay may result from switching from a single carrier mode to a dual carrier mode, this delay is minimized because reacquisition is not required.

Figure 2:
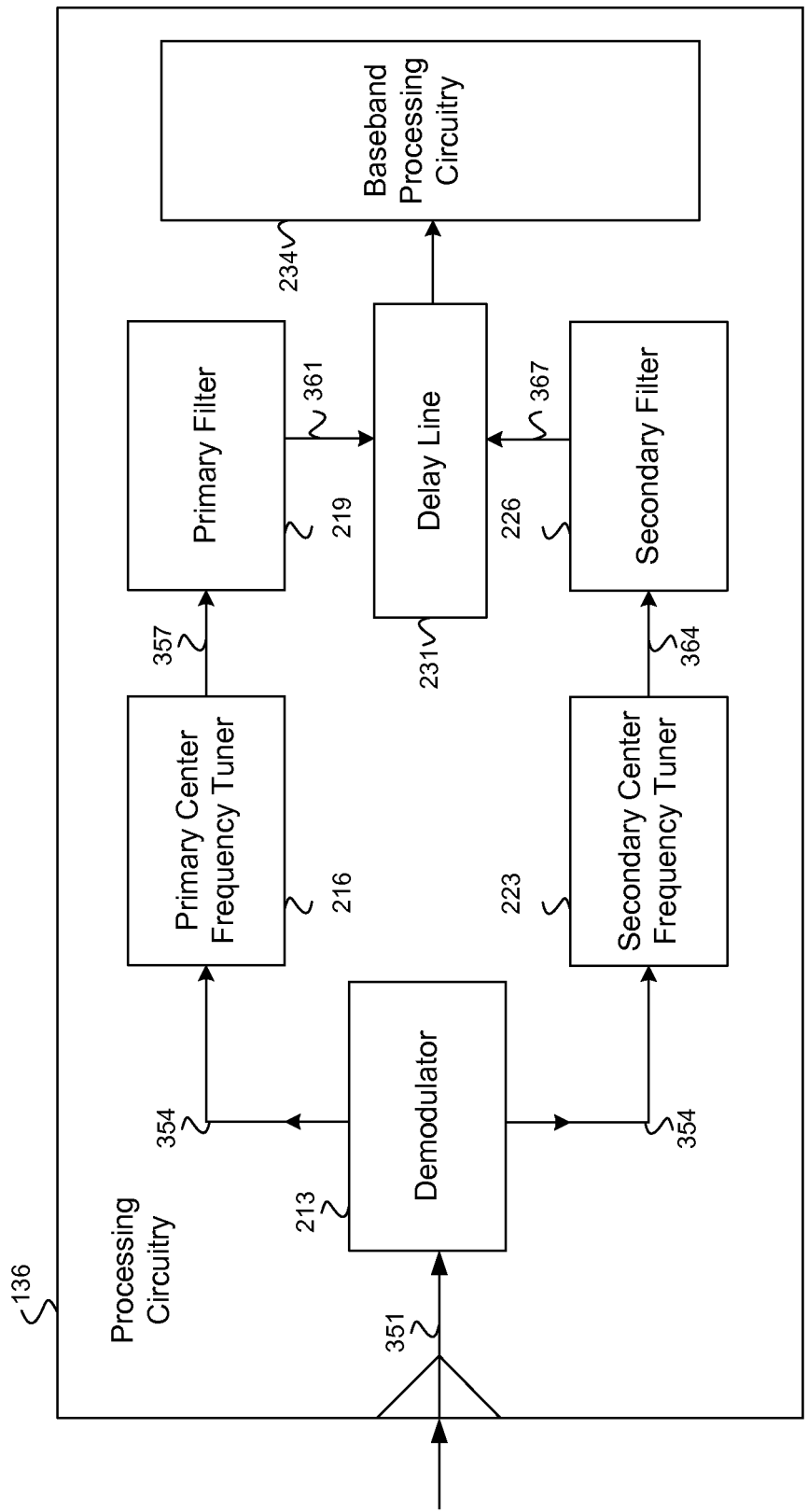
FIG. 2 is a diagram of an example of at least a portion of a wireless communication device within the wireless communication system of FIG. 1, in accordance with various embodiments.

Next, in FIG. 2 shown is a diagram of an example of at least a portion of a wireless communication device within the wireless communication system of FIG. 1, in accordance with various embodiments. FIG. 2, for example demonstrates various embodiments of the present disclosure in regard to performing carrier separation by the processing circuitry 136 of a wireless communication device 112 (FIG. 1). Carrier separation, for example, may be performed when a wireless communication device transitions from a single carrier mode to a dual carrier mode. Accordingly, when transitioning to a dual carrier mode, each carrier single included in a dual carrier signal should be subjected to carrier separation for identifying each carrier.

Furthermore, in FIG. 2, there is shown various signals and components included within the processing circuitry 136. In various embodiments, the components of the processing circuitry 136 are implemented as at least a portion of a microprocessor. These components of the processing circuitry 136 may further include one or more circuits and/or one or more microprocessors, application specific integrated circuits, dedicated hardware, or any combination thereof. In yet other embodiments, the components of the processing circuitry 136 may include one or more software modules executable within one or more processing circuits. In this case, software modules are stored in memory 139 (FIG. 1) and executed by one or more microprocessors within the processing circuitry 136.

The processing circuitry 136 receives a dual carrier RF signal 351. The dual carrier RF signal may be received by an antenna 134 (FIG. 1). The dual carrier RF signal 351 includes primary carrier data transmitted from a base station 102 (FIG. 1) and secondary carrier data transmitted by the base station 102. The primary carrier data may be encoded in a first carrier signal and the secondary carrier data may be encoded in a second carrier signal.

The demodulator component 213 converts RF signals to baseband signals. Accordingly, the demodulator component 213 receives a dual carrier RF signal 351 and generates a dual carrier baseband signal 354. In various embodiments, the demodulator component 213 sends the dual carrier baseband signal 354 to a primary branch and a secondary branch. The primary branch includes a signal path for separating the primary carrier data from the dual carrier baseband signal 354 while the secondary branch includes a signal path for separating the secondary carrier data from the dual carrier baseband signal 354. In this respect, carrier separation of the primary carrier data and the secondary carrier data may occur in parallel. This parallel processing allows for separating the carriers simultaneously.

In the primary branch, a primary center frequency tuner component 216 is used to locate the center frequency associated with the primary carrier data. The primary center frequency tuner component 216 generates a tuned primary data baseband signal 357. To this end, the tuned primary baseband signal 357 is prepared for filtering. The primary center frequency tuner component 216 may perform a frequency translation to align the center frequency for filtering. In various embodiments the primary center frequency tuner component 216 may employ a digital mixer to perform the frequency translation.

In the primary branch, there is also a primary filter component 219. The primary filter component 219 is configured to filter out frequencies other than those frequencies used to encode the primary carrier data. Accordingly, the primary filter component 219 suppresses adjacent carrier frequencies to effectively separate the primary carrier data from the baseband dual carrier signal 354. In one embodiment, among others, the primary filter component 219 includes one or more hardcoded coefficients. Ultimately, the primary filter component 219 is configured to extract the primary carrier data from the dual carrier radio frequency signal 351. The output of the primary filter component 219 is the primary carrier data encoded within a primary carrier data signal 361.

In the secondary branch, a secondary center frequency tuner component 223 is used to locate the center frequency associated with the secondary carrier data. The secondary center frequency tuner component 223 generates a tuned secondary data baseband signal 364. To this end, the tuned secondary baseband signal 364 is prepared for filtering. The secondary center frequency tuner component 223 may perform a frequency translation to align the center frequency for filtering. In various embodiments the secondary center frequency tuner component 223 may employ a digital mixer to perform the frequency translation.

In the secondary branch, there is also a secondary filter component 226. The secondary filter component 226 is configured to filter out frequencies other than those frequencies used to encode the secondary carrier data. Accordingly, the secondary filter component 226 suppresses adjacent carrier frequencies to effectively separate the secondary carrier data from the baseband dual carrier signal 354. In one embodiment, among others, the secondary filter component 226 includes one or more hardcoded coefficients. Ultimately, the secondary filter component 226 is configured to extract the secondary carrier data from the dual carrier radio frequency signal 351. The output of the secondary filter component 226 is the secondary carrier data encoded within a secondary carrier data signal 367.

The primary carrier data signal 361 and the secondary carrier data signal 367 may be transmitted to baseband processing circuitry 234 for further processing. Various embodiments of the present disclosure are directed to implementing a delay line 231 to delay transmission between the output of the carrier separation and the input of the baseband processing circuitry. That is to say, the signal or signals 361, 367 that contain the primary carrier data and the secondary carrier data are forced to be delayed. This delay ensures that the baseband signal processing performed by the baseband processing circuitry 234 is synchronized according to the transmission boundaries derived from the initial acquisition of the single carrier. When the processing circuitry 136 transitions from a single carrier mode to a dual carrier mode, the processing circuitry 136 does not need to perform a reacquisition. However, the processing circuitry 136 may need to ensure that synchronization is maintained when transitioning to a dual carrier mode. Through the use of delay lines 231, signals received by the broadband processing circuitry 234 are in alignment with any transmission boundaries ascertained during an initial acquisition and/or cell search procedure.

In various embodiments, the delay implemented by the delay line 231 is made up of a predetermined latency. The predetermined latency may be a pre-calculated value based on a latency caused by separating the primary carrier data from the baseband dual carrier signal 354 and separating the secondary carrier data from the baseband dual carrier signal 354. In other embodiments, the predetermined latency may be a relative value based on the intrinsic single carrier latency. In this respect, the difference in processing time between a single carrier mode and a dual carrier mode can be used as the basis for calculating the delay used for the delay line 231.

The components discussed with regard to FIG. 2 may also be used for processing signals in single carrier mode. To this end, the implementation of singular carrier mode and the implementation of dual carrier mode may result in a sharing of the processing resources discussed with respect to FIG. 2. For example, in single carrier mode, the primary branch may be used while the secondary branch is not used. In yet another example, the delay line 231 may implement a first delay for single carrier mode and a second delay for dual carrier mode. The delays implemented by the delay line 231 may be based on the latency of processing signals in a single carrier mode or dual carrier mode. Additionally, the center frequency tuner components 216, 223 may be used for frequency offset correction in a single carrier mode.

In various embodiments, the delay line 231 comprises a plurality of available predetermined latency values available for selection by the processing circuitry 136. These predetermined latency values may be calculated based on various operating conditions. Some non-limiting examples of operating conditions include, signal-to-noise ratios, degrees of Doppler shift, automatic gain control values, selected antennas, other channel conditions, carrier frequency values, filter coefficients, or any combination thereof. For example, when the processing circuitry 136 transitions to a dual carrier mode, one among a plurality of predetermined dual carrier latency values may be selected based on current operating conditions. To this end, a delay value may be predetermined based on particular operating conditions. Accordingly, the predetermined dual carrier latency value may be used when these particular operating conditions arise in subsequent operation.

For example, when transition to or from a dual carrier mode, the processing circuitry 136 may select a first latency value when the signal-to-noise ratio is low or a second latency value when the signal-to-noise ratio is high. In either case, the latency value is predetermined based on latency metrics of signal processing in varying operating conditions.

Figure 3A:
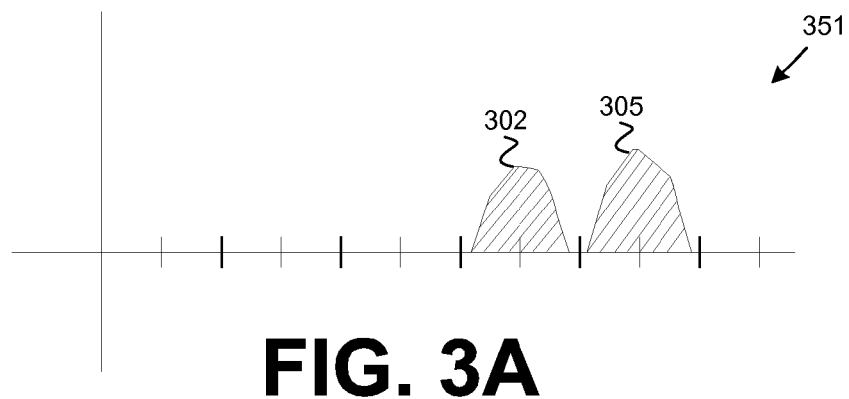
FIG. 3A is a diagram of an example of a signal processed by at least a portion of the wireless communication device of FIG. 2, in accordance with various embodiments of the present disclosure.

Turning to FIGS. 3A-F, shown are diagrams of examples of signals processed by at least a portion of the wireless communication device of FIG. 2, in accordance with various embodiments of the present disclosure. FIG. 3A depicts a frequency profile of a dual carrier RF signal 351. The dual carrier RF signal 351 is used to transmit primary carrier data 305 and secondary carrier data 302. The dual carrier RF signal 351 is received by one or more antennas 134 (FIG. 1). The aggregation of these various signals is depicted as the dual carrier RF signal 351 of FIG. 3A.

For example, the primary carrier data 305 may be data encoded in a single carrier signal 124 (FIG. 1) transmitted by a base station 102. In this respect, a carrier wave associated with the primary carrier signal may be modulated by a signal representing the primary carrier data 305 and transmitted to a wireless communication device 112 (FIG. 1) that includes processing circuitry 136 (FIG. 1) for processing the dual carrier RF signal. Similarly, the secondary carrier data 302 may be data encoded in a second carrier signal transmitted by the base station 102. A carrier wave associated with the second carrier signal may be modulated by a signal representing the secondary carrier data 302 and transmitted to a wireless communication device 112 (FIG. 1).

Figure 3B:
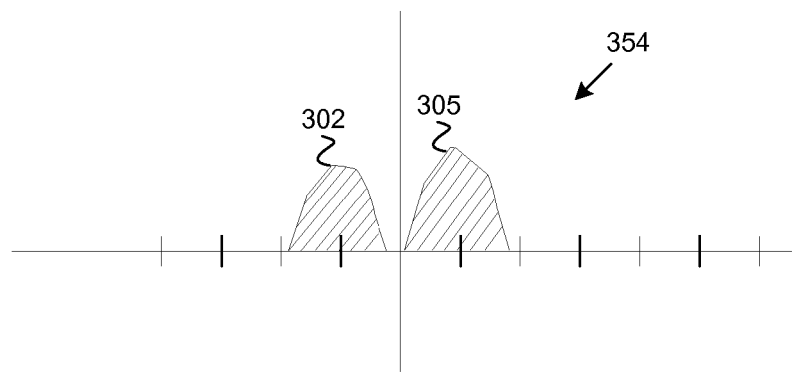
FIG. 3B is a diagram of an example of a signal processed by at least a portion of the wireless communication device of FIG. 2, in accordance with various embodiments of the present disclosure.

FIG. 3B depicts a frequency profile of a dual carrier baseband signal 354. The dual carrier baseband signal 354 is generated by a demodulator component 213 (FIG. 2) processing the dual carrier RF signal 351 of FIG. 3A. As seen in FIG. 3B, a carrier representing the primary carrier data 305 is placed adjacent to a carrier representing the secondary carrier data 302. As one example, among others, the two carriers of FIG. 3B may each represent a 5 MHz HSDPA carrier. Accordingly, the bandwidth of the dual carrier baseband signal 354 is 10 MHz. The distance from the center frequency of one carrier to the center frequency of the other carrier is 5 MHz. In various embodiments, the demodulator component 213 may locate the center frequency of the dual carrier baseband signal 354 and translate the dual carrier baseband signal 354 accordingly. The center frequency of the dual carrier baseband signal 354 is approximately the half-way point between the center frequencies of the respective carriers.

Figure 3C:
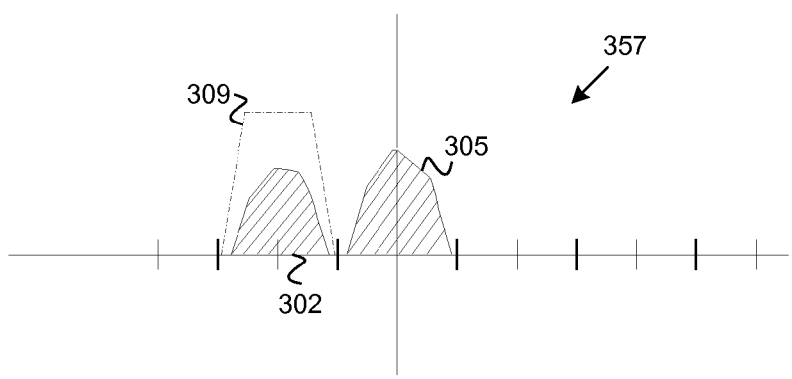
FIG. 3C is a diagram of an example of a signal processed by at least a portion of the wireless communication device of FIG. 2, in accordance with various embodiments of the present disclosure.

FIG. 3C depicts a frequency profile of a tuned primary baseband signal 357. The tuned primary baseband signal 357 is generated by a primary center frequency tuner component 216 (FIG. 2). As seen in FIG. 3C the center frequency of the carrier representing the primary carrier data 305 may be located and translated accordingly. The tuned primary baseband signal 357 is prepared to be filtered such that an adjacent carrier representing secondary carrier data 302 may be suppressed or otherwise filtered out. A filter target region 309 is shown to demonstrate the portions of the tuned primary baseband signal 357 that is subject to subsequent filtering.

Figure 3D:
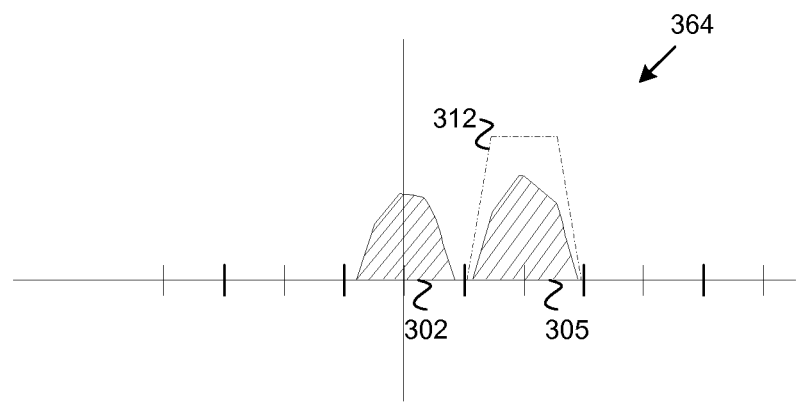
FIG. 3D is a diagram of an example of a signal processed by at least a portion of the wireless communication device of FIG. 2, in accordance with various embodiments of the present disclosure.

FIG. 3D depicts a frequency profile of a tuned secondary baseband signal 364. The tuned secondary baseband signal 364 is generated by a secondary center frequency tuner component 223 (FIG. 2). As seen in FIG. 3D the center frequency of the carrier representing the secondary carrier data 302 may be located and translated accordingly. The tuned secondary baseband signal 364 is prepared to be filtered such that an adjacent carrier representing primary carrier data 305 may be suppressed or otherwise filtered out. A filter target region 312 is shown to demonstrate the portions of the tuned secondary baseband signal 364 that is subject to subsequent filtering.

Figure 3E:
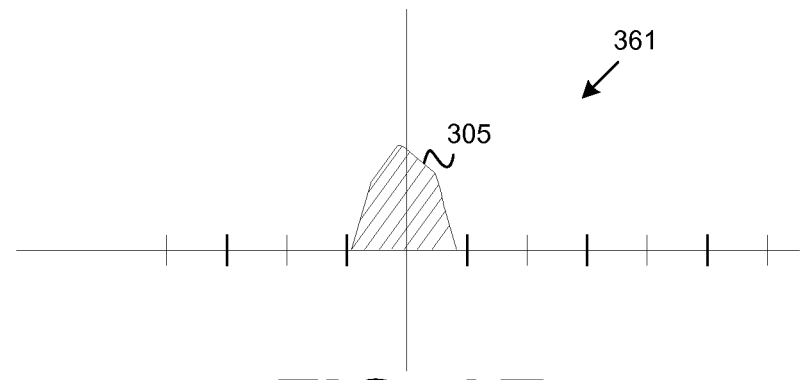
FIG. 3E is a diagram of an example of a signal processed by at least a portion of the wireless communication device of FIG. 2, in accordance with various embodiments of the present disclosure.

FIG. 3E depicts a frequency profile of a primary carrier data signal 361. The primary carrier data signal 361 includes the primary carrier data 305 and excludes the secondary carrier data 302 (FIG. 3A). The primary carrier data signal 361 is generated by the primary filter 219 (FIG. 2). Thus, FIG. 3E demonstrates an example of primary carrier data 305 subject to carrier separation of a dual carrier RF signal 351 (FIG. 3A) input.

Figure 3F:
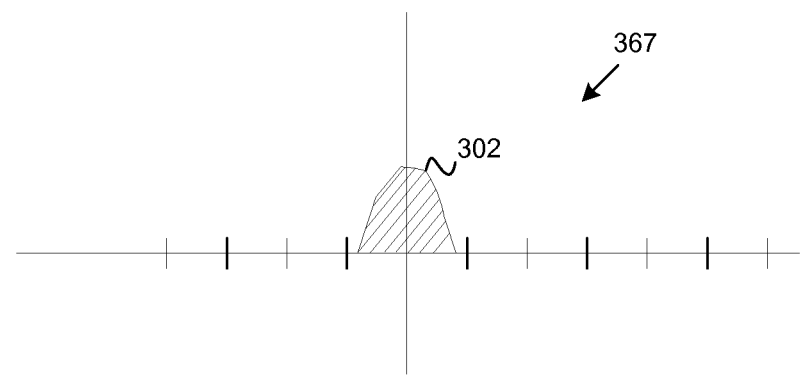
FIG. 3F is a diagram of an example of a signal processed by at least a portion of the wireless communication device of FIG. 2, in accordance with various embodiments of the present disclosure.

FIG. 3F depicts a frequency profile of a secondary carrier data signal 367. The secondary carrier data signal 367 includes the secondary carrier data 302 and excludes the primary carrier data 305 (FIG. 3A). The secondary carrier data signal 367 is generated by the secondary filter 226 (FIG. 2). Thus, FIG. 3F demonstrates an example of secondary carrier data 302 subject to carrier separation of a dual carrier RF signal 351 (FIG. 3A) input.

Figure 4:
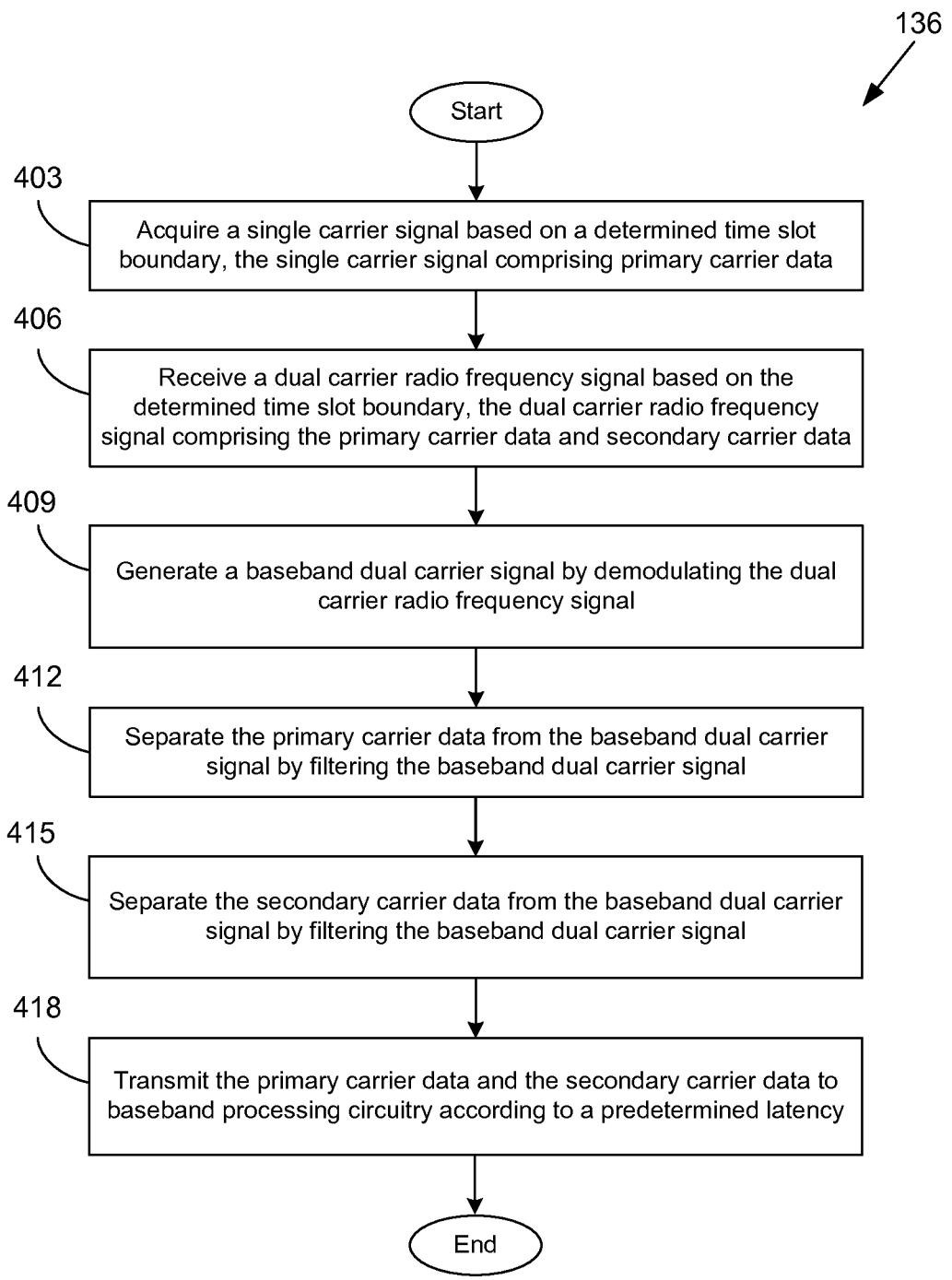
FIG. 4 is a flowchart illustrating examples of functionality implemented as portions of processing circuitry of FIG. 1, in accordance with various embodiments of the present disclosure.

Referring next to FIG. 4, shown is a flowchart illustrating examples of functionality implemented as portions of processing circuitry of FIG. 1, in accordance with various embodiments of the present disclosure. It is understood that the flowchart of FIG. 4 provides merely an example of the many different types of functional arrangements that may be employed to implement the operation of the processing circuitry 136 as described herein. As an alternative, the flowchart of FIG. 4 may be viewed as depicting an example of steps of a method implemented in the processing circuitry 136 according to one or more embodiments.

To begin, in block 403, the processing circuitry 136 acquires a single carrier signal based on a determined time slot boundary, the single carrier signal comprising primary carrier data. In various embodiments, a base station 102 (FIG. 1) transmits the single carrier signal as the processing circuitry 136 is configured to operate in single carrier mode. Moreover, the wireless communication device 112 (FIG. 1) that employs the processing circuitry 136 has completed acquisition. That is to say, the transmission boundaries for synchronized communication over the cellular network have been ascertained. The time slot boundary, for example, may be determined based on a primary synchronization signal.

In various embodiments, while the processing circuitry 136 is configured to operate in a single carrier mode, the processing circuitry may utilize the components discussed in FIG. 2. For example, the center frequency tuner components 216, 223 (FIG. 2) may be used for frequency offset correction in a single carrier mode. Also, the delay lines 231, the filtering components 219, 226, the demodulator component 213, or any combination thereof may be used to facilitate operation in the single carrier mode.

In block 406, the processing circuitry 136 receives a dual carrier radio frequency signal 351 (FIG. 3A) based on the determined time slot boundary, the dual carrier radio frequency signal 351 comprising the primary carrier data 305 (FIG. 3A) and secondary carrier data 302 (FIG. 3A). In various embodiments, the dual carrier radio signal 351 is received in response to a request for additional bandwidth. The dual carrier radio frequency signal 351 is received without reacquisition. Thus, the wireless communication device 112 may maintain synchronization while transitioning to a dual carrier mode. Furthermore, while in dual carrier mode, the wireless mobile device 112 may receive the dual carrier radio frequency signal 351 from a base station 102.

In block 409, the processing circuitry 136 generates a baseband dual carrier signal 354 (FIG. 3B) by demodulating the dual carrier radio frequency signal 351. The processing circuitry 136 may use a demodulator component 213 to convert RF signals into baseband signals. Furthermore, the processing circuitry 136 may perform a frequency translation to locate and align the center frequency of the baseband dual carrier signal 354.

In block 412, the processing circuitry 136 separates the primary carrier data 305 from the baseband dual carrier signal 354 by filtering the baseband dual carrier signal 354. The processing circuitry 136 may employ a primary center frequency tuner 216 (FIG. 2) to perform a frequency translation on the baseband dual carrier signal 354. The processing circuitry 136 may also employ a primary filter 219 (FIG. 2) to extract the carrier that represents the primary carrier data 305.

In this respect, in block 412, the processing circuitry 136 suppresses the frequencies of adjacent carriers to separate the primary carrier data 305 from the baseband dual carrier signal 354.

In block 415, the processing circuitry 136 separates the secondary carrier data 302 from the baseband dual carrier signal 354 by filtering the baseband dual carrier signal 354. The processing circuitry 136 may employ a secondary center frequency tuner 223 (FIG. 2) to perform a frequency translation on the baseband dual carrier signal 354. The processing circuitry 136 may also employ a secondary filter 226 (FIG. 2) to extract the carrier that represents the secondary carrier data 302. In this respect, in block 415, the processing circuitry 136 suppresses the frequencies of adjacent carriers to separate the secondary carrier data 302 from the baseband dual carrier signal 354.

In block 418, the processing circuitry 136 transmits the primary carrier data 305 and the secondary carrier data 302 to baseband processing circuitry 234 (FIG. 2) according to a predetermined latency. The primary carrier data 305 may be encoded within a primary carrier and transmitted as a primary carrier data signal 361. The secondary carrier data 302 may be encoded within a secondary carrier and transmitted as a secondary carrier data signal 367. In various embodiments, the processing circuitry 136 employs a delay line 231 to apply a predetermined delay. In various embodiments, forcing the delay allows the processing circuitry 136 to continue being synchronized without having to perform reacquisition. To this end, the processing circuitry 136 may switch from a single carrier mode to a dual carrier mode without reacquiring transmission boundaries.

The flowchart of FIG. 4 shows the functionality and operation of an implementation of portions of the processing circuitry 136 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processing circuitry 136 in a computer system or other system. The program instructions may be stored in a memory 139 (FIG. 1). The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code, for example, code or instructions to execute portions of the processing circuitry 136, can be embodied in any non-transitory computer-readable medium for use by or in connection with an instruction execution system such as, for example, processing circuitry 136 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method for processing circuitry, comprising:
generating a baseband dual carrier signal by demodulating a dual carrier radio frequency signal received based at least on a determined time slot boundary;
separating primary carrier data from the baseband dual carrier signal by filtering the baseband dual carrier signal; and
separating secondary carrier data from the baseband dual carrier signal by filtering the baseband dual carrier signal.

2. The method of claim 1, wherein the determined time slot boundary is determined from a primary synchronization signal.

3. The method of claim 2, wherein the time slot boundary is a frame boundary.

4. The method of claim 1, wherein the dual carrier radio frequency signal is received from a base station.

5. The method of claim 1, wherein the dual carrier radio signal is received in response to a request for additional bandwidth.

6. The method of claim 5, wherein the request is sent from a wireless device configured to receive the dual carrier signal.

7. The method of claim 1, wherein separating the primary carrier data from the baseband dual carrier signal comprises identifying a center frequency of the baseband dual carrier signal.

8. The method of claim 7, wherein separating the primary carrier data from the baseband dual carrier signal further comprises translating the identified center frequency.

9. The method of claim 8, wherein separating the primary carrier data from the baseband dual carrier signal further comprises applying a filter to filter out a secondary carrier baseband frequency range, the secondary carrier data being encoded within the secondary carrier baseband frequency range, wherein the filter comprises hardcoded coefficients.

10. The method of claim 1, further comprising transmitting the primary carrier data and the secondary carrier data to baseband processing circuitry based at least on a latency.

11. The method of claim 10, wherein the latency is caused at least by separating the primary carrier data from the baseband dual carrier signal and separating the secondary carrier data from the baseband dual carrier signal.

12. A system for signal processing, comprising:
 a demodulator configured to demodulate a dual carrier radio frequency signal received based at least on a determined timeslot boundary to generate a baseband dual carrier signal;
 a first filter configured to suppress adjacent carrier frequencies to separate primary carrier data from the baseband dual carrier signal; and
 a second filter configured to suppress adjacent carrier frequencies to separate secondary carrier data from the baseband dual carrier signal.

13. The system of claim 12, further comprising at least one first circuit configured to acquire a single carrier signal based at least on a determined time slot boundary, the single carrier signal comprising the primary carrier data.

14. The system of claim 13, wherein the at least one second circuit is configured to receive the dual carrier radio frequency signal based at least on the determined time slot boundary.

15. The system of claim 12, wherein the dual carrier radio signal is received in response to a request for additional bandwidth.

16. The system of claim 12, further comprising a digital mixer configured to perform a frequency translation and prepare the baseband dual carrier signal for filtering by the first filter.

17. The system of claim 12, further comprising a delay line configured to transmit the primary carrier data and the secondary carrier data to at least one baseband processor circuit based at least on a latency.

18. A carrier separation circuit comprising:
 at least one first circuit configured to generate a secondary carrier baseband signal by extracting secondary carrier data from a dual carrier radio frequency signal; and
 at least one second circuit configured to delay a transmission of the secondary carrier baseband signal to baseband processing circuitry based at least on a dual carrier latency.

19. The carrier separation circuit of claim 18, further comprising:
 at least one third circuit configured to receive a single carrier radio frequency signal comprising primary carrier data transmitted from a base station; and
 at least one third circuit configured to generate a single carrier frequency baseband signal based at least on the single carrier radio frequency signal causing an intrinsic single carrier latency, wherein the dual carrier latency is determined based at least on the intrinsic single carrier latency.

20. The carrier separation circuit of claim 18, wherein the at least one second circuit is configured to select one of a plurality of dual carrier latency values, each dual carrier latency value corresponding to a respective operating condition.

* * * * *